United States Patent [19]
Yoshimoto et al.

[11] Patent Number: 5,692,838
[45] Date of Patent: Dec. 2, 1997

[54] HYDROSTATIC BEARING WITH SELF-CONTROLLED RESTRICTING MECHANISM

[75] Inventors: Shigeka Yoshimoto, Tokyo; Kenji Okamoto, Niiza; Tetsuo Nakamura, Tsukuba, all of Japan

[73] Assignee: Mitutoyo Corporation, Kanagawa, Japan

[21] Appl. No.: 698,949

[22] Filed: Aug. 16, 1996

[30] Foreign Application Priority Data

Aug. 18, 1995 [JP] Japan .................................. 7-233304

[51] Int. Cl.⁶ .................................................. F16C 32/06
[52] U.S. Cl. ............................................ 384/12; 384/100
[58] Field of Search .............................. 384/12, 100, 111, 384/118, 119, 124

[56] References Cited

U.S. PATENT DOCUMENTS

| | | | |
|---|---|---|---|
| 3,799,628 | 3/1974 | Van Gaasbeek et al. | 384/12 |
| 4,080,009 | 3/1978 | Marathe et al. | 384/12 |
| 4,413,864 | 11/1983 | Phillips | 384/12 |
| 4,521,121 | 6/1985 | Klein et al. | 384/100 |
| 4,560,213 | 12/1985 | Enderle et al. | 384/12 X |
| 4,719,705 | 1/1988 | Laganza et al. | 384/12 X |

OTHER PUBLICATIONS

Transactions of the ASME, Journal of Lubrication technology, Department of Mechanical Engineering—University of Natal, South Africa, Jan. 1977, "Static and Dynamic Performance of an Infinite Stiffness Hydrostatic Thrust Bearing", N. Tully, pp. 106–112.

*Primary Examiner*—Thomas R. Hannon
*Attorney, Agent, or Firm*—Oliff & Berridge

[57] ABSTRACT

An aerostatic bearing comprises a bearing base having a plurality of first through-holes for air intake, a bearing clearance being formed between the bearing surface and the thrust shaft, and a self-controlled restrictor disposed so as to form a restricting spacing with the reverse surface of the bearing base, the self-controlled restrictor being adapted for automatically adjusting the flow rate of air supplied to the bearing surface corresponding to the variation of the pressure on the bearing surface. The self-controlled restrictor has a restricting disc and a circular leaf spring. The restricting disc has a second through-hole at the center. The restricting disc is held by an O ring that also functions as a fluid sealing. The second through-hole is adapted for supplying air to the restricting spacing. The circular leaf spring is integrally formed with the restricting disc of a bottomed cylindrical member. Air supplied from the second through-hole to the restricting spacing flows as a diverging flow. Thus, a restoring force is applied corresponding to the deviation of the angle of the restricting disc.

14 Claims, 6 Drawing Sheets

FRONT VIEW

SIDE VIEW 5,692,838

HYDROSTATIC BEARING WITH SELF-CONTROLLED RESTRICTING MECHANISM

BACKGROUND OF THE INVENTION (1) Field of the Invention

The present invention relates to a hydrostatic bearing for holding one of two relatively movable members in non-contact condition, in particular, a hydrostatic bearing suitable for a bearing of a movable portion of a variety of precise measurement units and precise machine tools.

(2) Description of the Related Art

A hydrostatic bearing is a non-contact type bearing that guides fluid such as air, lubrication oil or the like to the inside thereof and obtains a load capacity by a restricting effect. Although the hydrostatic bearing has advantages such as low friction and a high moving accuracy due to an averaging effect, it has disadvantages such as low stiffness and low damping characteristic. To improve the stiffness of the hydrostatic bearing, it is effective to minimize the bearing clearance. In addition, to optimally design a bearing with a small bearing clearance, the amount of a fluid that flows in the bearing should be restricted corresponding to the bearing clearance.

However, when the bearing clearance is decreased, the machining accuracy of the bearing should be improved. Thus, there is a limitation on the improvement of the stiffness of the bearing by means of a decrease of the bearing clearance. To overcome the limitation, various variable restricting mechanisms have been proposed.

As an example of such mechanisms, a diaphragm type variable restricting bearing as shown in FIG. 8 or FIG. 9 is known. In this example, the bearing surface is composed of an elastically deformable diaphragm. The shape of the bearing surface is deformed corresponding to a pressure change on the bearing surface due to a load change applied to the bearing. Thus, a high bearing stiffness can be accomplished. Particularly, in the mechanism shown in FIG. 9, the inner periphery of the diaphragm that structures the bearing surface is secured, whereas the outer periphery of the diaphragm is elastically supported by an 0 ring. The pressure of the rear surface of the diaphragm varies corresponding to the pressure on the bearing surface through a small hole formed nearly at the center of the housing. Thus, the shape of the diaphragm sensitively varies corresponding to the variation of the load. Such a diaphragm type variable restricting bearing has been disclosed in for example U.S. Pat. No. 4,560,213.

When the above-described diaphragm type variable restricting mechanism is used with proper bearing conditions, high bearing stiffness can be accomplished. However, the above-described diaphragm type variable restricting mechanism has the following disadvantages. (a) Since the bearing surface should be deformed, the applications of the bearing are limited. (b) When the diaphragm is largely deformed, a pocket is formed in the bearing. Thus, the diaphragm may self oscillate due to compression of air. (c) It is difficult to machine the diaphragm. Depending to the machining accuracy, the bearing characteristics vary, thereby affecting the durability of the diaphragm.

As another example of the variable restricting mechanisms, a mechanism with a piezoelectric actuator as shown in FIG. 10 is known. In this example, the displacement of a shaft supported by a bearing is directly measured by a non-contact type displacement sensor. The restricting spacing is controlled by the piezoelectric actuator so that the displacement of the shaft becomes minimum and thereby control the amount of air that passes through the restricting spacing.

Although the variable restricting mechanism can easily control the bearing clearance, the scale of the driving unit of the piezoelectric actuator becomes large. In addition, it is apprehensive that the durability of the piezoelectric actuator becomes low. Thus, to accomplish such a mechanism, there are problems about technologies and cost.

When the hydrostatic bearing is used for such as a precise measuring unit or a precise machine tool, sometimes the size reduction and relatively high stiffness of bearing may be superior to high bearing load as important objectives to be accomplished. In this situation, to improve the bearing stiffness, the variable restricting mechanism may be effectively added to the hydrostatic bearing. However, it is necessary to solve the following problems.

(1) When the pressure and viscous force of a fluid acts on the variable restrictor, the motion of the restrictor should always operate on the stable side with stable bearing characteristics free from hysteresis or the like.

(2) To accomplish the size reduction and simple structure of the variable restrictor, the required bearing characteristics should be attained without need to use an actuator such as a piezoelectric device so as to improve the generality of the bearing mechanism.

(3) To employ the variable restrictor, the stability of the bearing surface and the restrictor against vibrations should be secured.

SUMMARY OF THE INVENTION

An object of the present invention is to provide a hydrostatic bearing that accomplishes high stiffness and stable bearing characteristics against variations of the load applied to the bearing and that has a variable restricting mechanism with a small simple structure and high generality.

The present invention is a hydrostatic bearing mounted on a first member for supporting a second member with fluid pressure, the first and second members being adjacently disposed with each other so as to be relatively movable, comprising: a bearing base adapted to face the second member with a bearing clearance; and a self-controlled restrictor for automatically adjusting flow rate of fluid supplied to the bearing clearance corresponding to a pressure applied to the bearing base, wherein the bearing base comprises: a bearing pad portion having a bearing surface opposite to the second member with the bearing clearance, the bearing surface being communicated with the reverse surface of the bearing pad portion via a plurality of first through-holes, the first through-holes being arranged on a circular periphery of the bearing surface; and a housing portion formed on the reverse surface of the bearing pad portion so as to have a cylindrical hole for equally exposing the first through-holes, and the self-controlled restrictor comprises: a circular restricting member buried in the cylindrical hole in such a manner that a sealed variable restricting spacing is formed with the reverse surface of the bearing pad portion, the circular restricting member having a second through-hole at the center for supplying the fluid from outside to the restricting spacing, the fluid flowing as a diverging flow in the restricting spacing to be supplied in the bearing clearance via the first through-holes; and a support member buried in the cylindrical hole for elastically supporting the circular restricting member.

In the automatic restricting mechanism according to the present invention, with the circular restricting member that operates only by a mutual operation of the deformed force of the supporting member that elastically supports it and the pressure of fluid corresponding to a change of the load applied to the bearing, the fluid supplied to the bearing clearance is restricted. Thus, the load capacity of the bearing is automatically and variably controlled. In addition, a plurality of first through-holes of the bearing pad portion are formed on a periphery with a predetermined diameter. On the other hand, a second through-hole of the circular restricting member is formed at the center of the circular restricting member. Thus, the fluid flows in the restricting spacing divergently (i.e., from the center to the outward). Consequently, when the angle of the restricting member varies and thereby the restricting spacing gets unbalanced, the self-controlled restrictor always operates on the stable side so as to restore the restricting member to its original state. As a result, according to the present invention, the mechanism provides stable bearing characteristics and high bearing stiffness.

In addition, according to the present invention, since a piezoelectric actuator or the like is not used, a small, simple, and general self-controlled restrictor can be accomplished.

Moreover, according to the present invention, the bearing base has a bearing pad portion and a housing portion which are integrally formed with each other. The self-controlled restrictor is buried in the housing portion. Thus, the variable restrictor is disposed adjacently to the bearing surface. Consequently, an excellent response characteristic can be accomplished.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
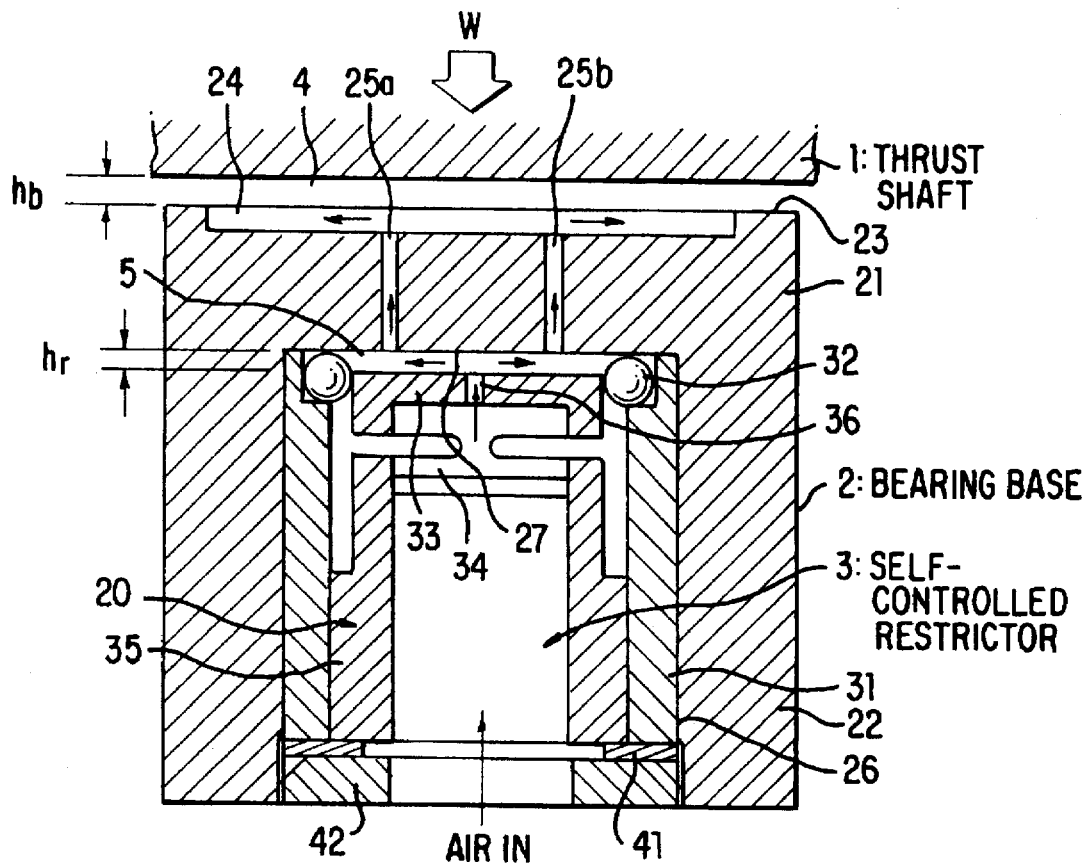
FIG. 1 is a sectional view showing an aerostatic thrust bearing according to an embodiment of the present invention.

FIG. 1 shows a structure of an aerostatic bearing mounted on a guide member side of which one of two members that mutually move is a guide member and the other is a thrust shaft 1 that is guided by the guide member. A bearing base 2 that supports the thrust shaft 1 is composed of a bearing pad portion 21 and a housing portion 22. The bearing pad portion 21 and the housing portion 22 are composed of rigid bodies. The bearing pad portion 21 and the housing portion 22 are, for example, integrally formed the guide member. Alternatively, the bearing pad portion 21 and the housing portion 22 are formed separately from the guide member and then mounted on the guide member. A flat square surface formed opposite to the thrust shaft 1 of the bearing pad portion 21 is a bearing surface 23. To supply air to the bearing surface 23 for a predetermined bearing clearance 4 (=hb) between the bearing surface 23 and the thrust shaft 1, a plurality of first through-holes 25 are formed on a periphery with a predetermined radius of the bearing pad portion 21. The bearing surface 23 is communicated with the reverse surface 27 via the first through-holes 25. In this embodiment, as the first through-holes 25, four through-holes 25a, 25b, 25c, and 25d are formed. The housing portion 22 has cylindrical hole 26 for equally exposing the first through-holes 25 of the bearing pad portion 21. The center axis of the cylindrical hole 26 accords with the center of the bearing pad portion 21 (namely, the center of the circle of which the first through-holes 25 are arranged). A self-controlled restrictor 3 that automatically adjusts the flow rate of air supplied to the bearing clearance 4 corresponding to the variation of the pressure in the bearing clearance 4 is buried in the cylindrical hole 26 of the housing portion 22.

Figure 2:
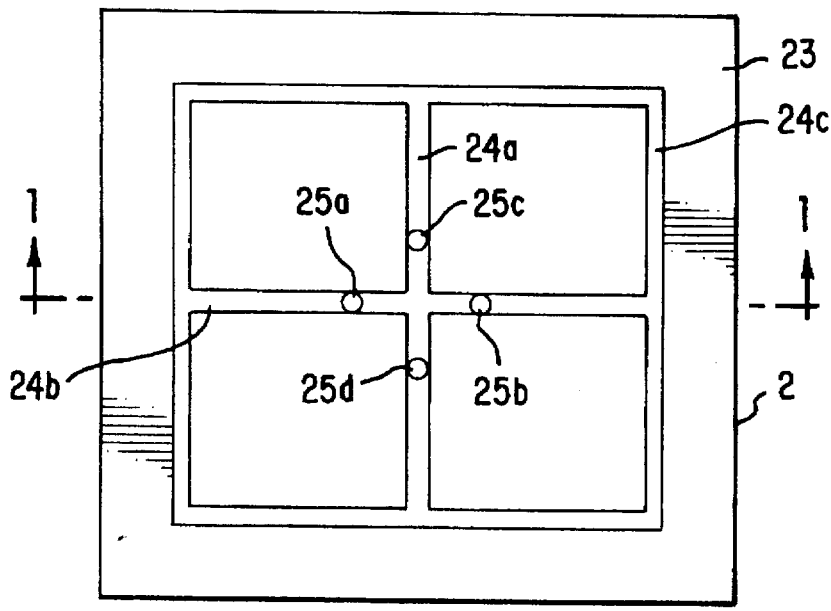
FIG. 2 is a plan view showing a bearing surface according to the embodiment of the present invention.

Air-in grooves 24 are formed on the bearing surface 23 of the bearing pad portion 21. In this embodiment, as shown in a plan view shown in FIG. 2, cross-shaped grooves 24a and 24b that perpendicularly intersect at the center thereof are formed. In addition, a square-shaped groove 24c that connects ends of the grooves 24a and 24b is formed. The first through-holes 25 are so formed as to overlay with the cross-shaped grooves 24a and 24b.

The self-controlled restrictor 3 has a restricting disc 33 that is disposed opposite to the reverse surface 27 of the bearing pad 21 and that is spaced apart therefrom by a predetermined restricting spacing 5 (=hr). The restricting disc 33 has a second through-hole 36 at the center so as to supply air from the outside of the housing 22 to the restricting spacing 5. The restricting disc 33 is elastically supported to a cylindrical support member 35 through a circular leaf spring 34 serving as an elastic hinge. The restricting disc 33, the circular leaf spring 34, and the cylindrical support member 25 are inserted into a cylindrical socket 31 and secured thereto with a bonding agent. The cylindrical socket 31 is inserted into the housing 22. The open end side of the cylindrical hole 26 is threaded. A ring-shaped screw 42 is mated with the threads of the cylindrical hole 26 through a ring-shaped plate 41. Along with the cylindrical socket 31, the self-controlled restrictor 3 is buried and secured in the housing 22. The hollow portion of the ring-shaped screw 42 functions as an air supply portion for supplying air from the outside of the housing portion 22 to the self-controlled restrictor 3.

The outer diameter of each of the restricting disc 33 and the circular leaf spring 34 is smaller than the outer diameter of the cylindrical support member 35. Thus, the restricting disc 33 and the circular leaf spring 34 can be displaced and deformed in the socket 31. The real structure and fabrication method of the self-controlled restrictor 3 will be described later.

An O ring 32 that functions as a damping member is disposed in a space formed between a shouldered inner surface at the end portion of the socket 31 and the restricting disc 33. The O ring 32 functions as a sealing member for sealing the restricting spacing 5. In other words, the O ring 32 allows air to flow to the restricting spacing 5 via the through-hole 36 of the restricting disc 33, thereby preventing air from flowing from the periphery of the restricting disc 33 to the restricting spacing 5.

Figure 3A:
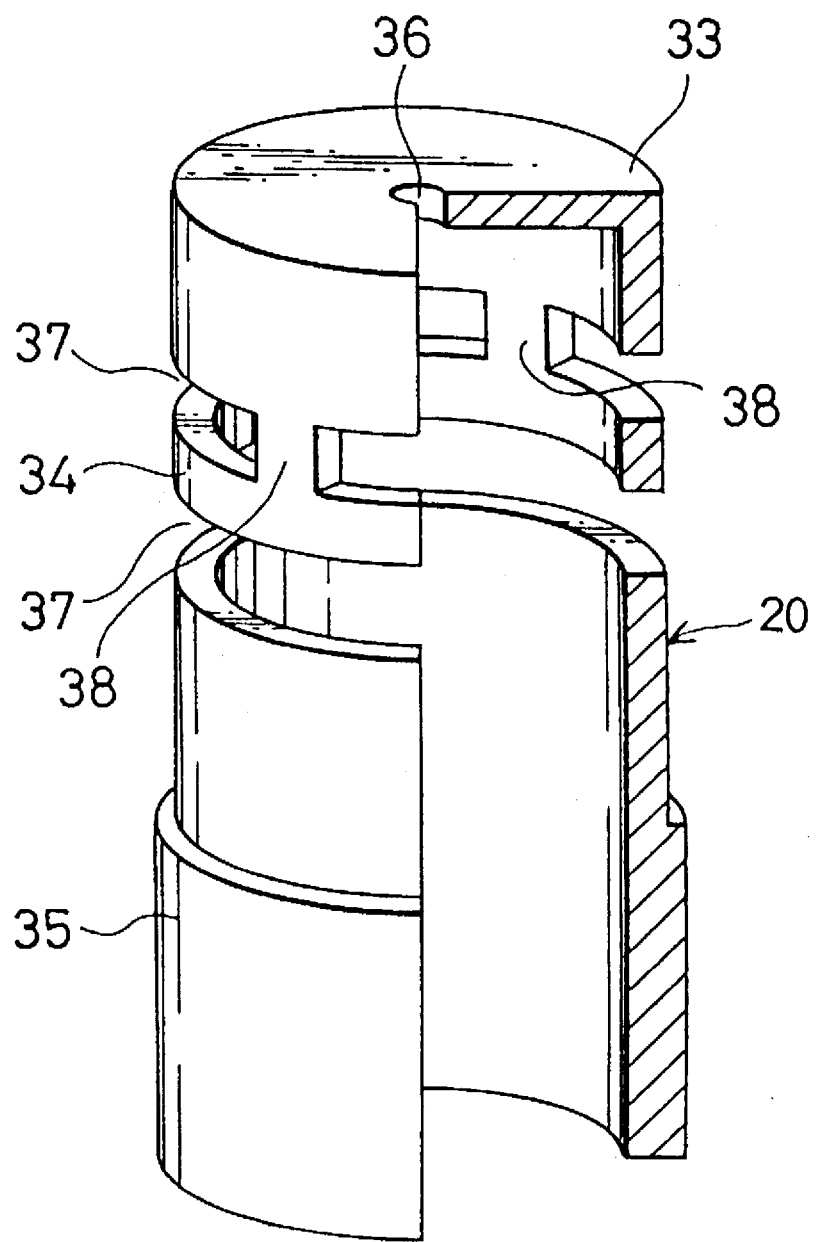
FIGS. 3A to 3C show a structure of a self-controlled restrictor according to the embodiment of the present invention.

FIG. 3A is a partial exploded view showing the restricting disc 33, the circular leaf spring 34, and the support member 35 of the self-controlled restrictor 3. The self-controlled restrictor 3 is integrally formed of a bottomed cylindrical member 20 composed of stainless steel having an open end as a fluid supply port. The diameter of the portion of the circular leaf spring 34 and the restricting disc 33 on the cylindrical member 20 is smaller than the diameter of the support member 35 on the open end side. The bottom plate portion of the cylindrical member 20 is used as the restricting disc 33. The second through-hole 36 is formed at the center of the restricting disc 33. A plurality of slits 37 are formed on the periphery of the bottomed cylindrical member 20 by the wire-cut method in such a manner that two joint portions 38 are left at intervals of 180 degrees as shown in FIG. 3A. Thus, the circular leaf spring 34 that functions as an elastic hinge is formed in the middle of the bottomed cylindrical member 20. The restricting disc 33 is elastically supported by the circular leaf spring 34 to the cylindrical support member 35.

Figure 3B:
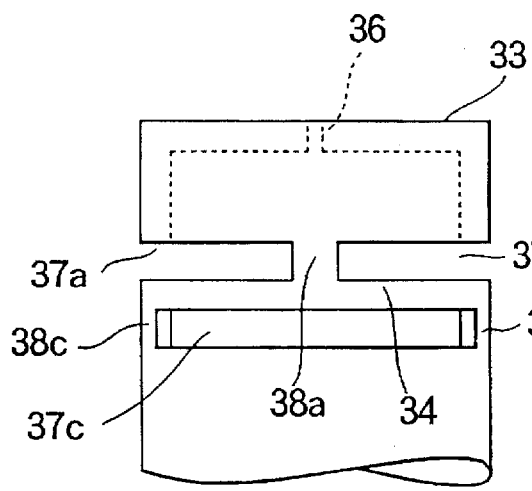
Figure 3C:
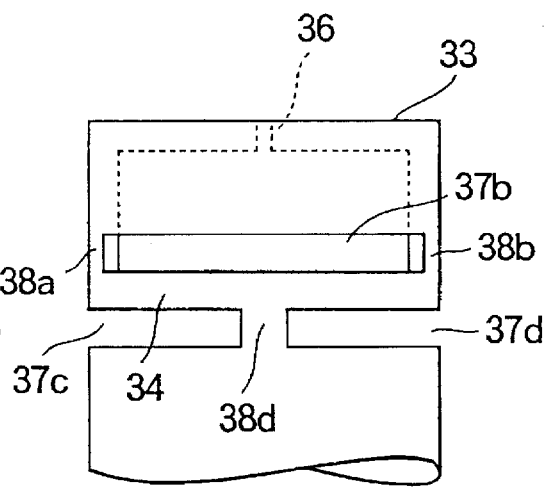

In this embodiment, the circular leaf spring 34 is formed by machining two pairs of slits (37a, 37b) and (37c, 37d), as shown in FIGS. 3B and 3C. A first pair of slits (37a, 37b) is formed at a predetermined height position of the bottomed cylindrical member 20 in such a manner that two joint portions 38a, 38b are left at intervals of 180 degrees. A second pair of slits (37c, 37d) is formed at lower position than the first pair of slits (37a, 37b) in such a manner that two joint portions 38c, 38d are left at intervals of 180 degrees. The first and second pairs of slits (37a, 37b) and (37c, 37d) are 90 degrees shifted from each other. If necessary, the circular leaf spring 34 can be formed by machining more pairs of slits.

Next, the operation of the aerostatic thrust bearing in the above-described structure will be described. As denoted by arrows shown in FIG. 1, air is supplied from the rear of the housing portion 22 to the restricting spacing 5 via the through-hole 36 formed in the restricting disc 33 of the self-controlled restrictor 3, and subsequently supplied to the bearing surface 23 via the through-holes 25a to 25d of the bearing pad portion 21. In the restricting spacing 5, air divergently flows from the center to the periphery. On the other hand, air supplied to the bearing surface 23 via the through-holes 25 diverges in four directions and flows to the bearing clearance 4 along the grooves 24a and 24b. Thus, a hydrostatic pressure is equally applied to the entire bearing surface 23.

As the load W applied to the thrust shaft 1 increases, the bearing clearance hb decreases and the bearing pressure Pb increases. The increased bearing pressure is transmitted to the bearing clearance hr via the through-holes 25 of the bearing pad portion 21, thereby increasing the restricting pressure Pr. Thus, the restricting disc 33 is pressed, thereby increasing the restricting spacing hr. The restricting disc 33 is stopped at the position where the restricting pressure Pr accords with the elastic force of the circular leaf spring 34.

When the restricting spacing hr increases, the flowing resistance of air in the restricting spacing hr decreases and the flow rate of air increases, thereby high pressure air is supplied to the bearing clearance hb via the through-holes 25 to further increase the bearing pressure Pb. Therefore, as the load W increases, the load capacity of the bearing increases. In other words, a force acts on the thrust shaft 1 so as to restore the thrust shaft 1 to its original state.

In contrast, when the bearing clearance hb increases as the load W decreases, the load capacity of the bearing decreases in the reverse process as described above. Thus, a force acts on the thrust shaft 1 to restore the thrust shaft 1 to its original state, as similar to the above-described operation.

Consequently, since the self-controlled restrictor 3 causes the thrust shaft 1 to be always placed at a predetermined position, a high bearing stiffness can be attained.

In the self-controlled restrictor 3 according to the embodiment, the force that acts on the restricting disc 33 is the pressure of air, the viscous force thereof, and the elastic force of the O ring 32 and the circular leaf spring 34. However, when these types of force act on, the circular plate 33 is not always displaced in parallel with the bearing pad portion 21. In other words, when unequal force act on the restricting disc 33, the restricting disc 33 is displaced with a predetermined inclination. However, as described above, according to the embodiment of the present invention, air that flows in the restricting spacing hr is a diverging flow that flows from the center of the restricting disc 33 to the periphery thereof. The diverging flow contributes to restore the inclined displacement of the restricting disc 33. Next, the operation of the diverging flow will be described with reference to FIG. 4.

Figure 4:
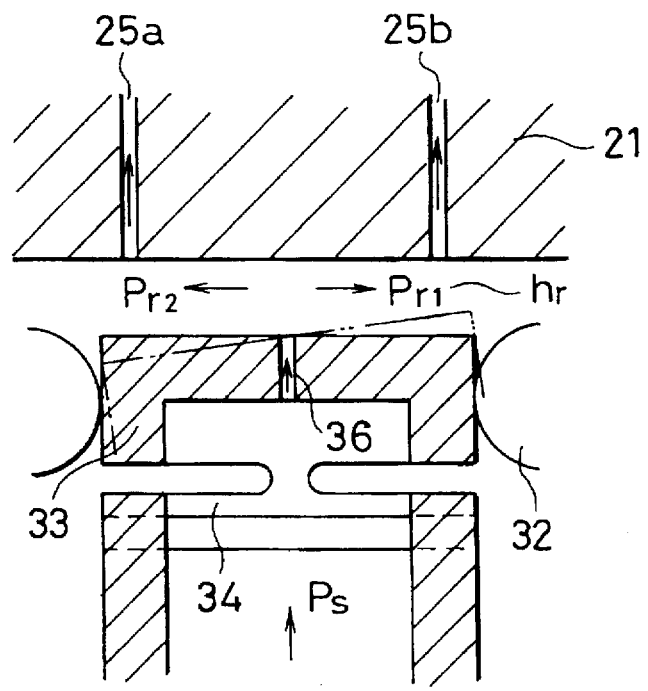
FIG. 4 is a schematic diagram for explaining the operation of the self-controlled restrictor according to the embodiment of the present invention.

As denoted by dotted lines shown in FIG. 4, assume that the restricting disc 33 is angularly displaced. Thus, the restricting spacing hr is unbalanced and the restricting pressure Pr at a left portion and a right portion of the restricting disc 33 is denoted by Pr1 and Pr2, respectively. In this state, since the flow of air in the restricting spacing hr is a diverging flow, the relation of Pr1>Pr2 is always satisfied. Therefore, a restoring force in the direction of which the angular displacement is removed acts on the restricting disc 33. In other words, the self-controlled restrictor 3 according to the embodiment of the present invention always operates on the stable side.

Figure 5:
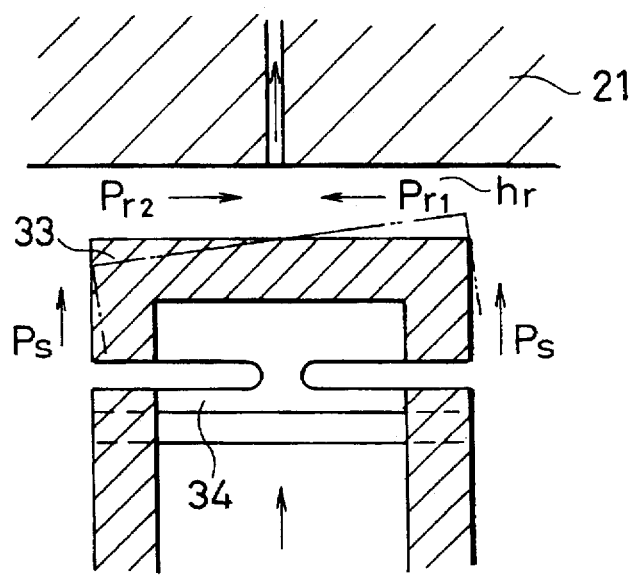
FIG. 5 is a schematic diagram for explaining the operation of the self-controlled restrictor according to a related art reference.

For reference, FIG. 5 shows the case of which a converging flow is used unlike with the embodiment of the present invention. In this example, a restricting disc 33 does not have a through-hole, and there is no O-ring. Air supplied from the lower portion flows to the outer periphery of the restricting disc 33 through slits 37, and is supplied to the restricting spacing hr as a converging flow. In such a manner, variable restricting can also be performed. In this case, the force that acts on the restricting disc 33 is the pressure of air, the viscous force thereof, and the elastic force of the circular leaf spring 34.

At this state, as similar to FIG. 4, assume that the restricting disc 33 is angularly displaced, and the restricting pressure Pr is denoted by Pr1 and Pr2. Since the air flow in the restricting spacing hr is a converging flow from the outer periphery of the restricting disc 33 to the center, the restricting pressure has the relation of Pr1<Pr2. Consequently, the restricting pressure acts in the direction of which the angular displacement of the restricting disc 33 increases. As a result, this self-controlled restrictor has unstable characteristics.

Figure 6:
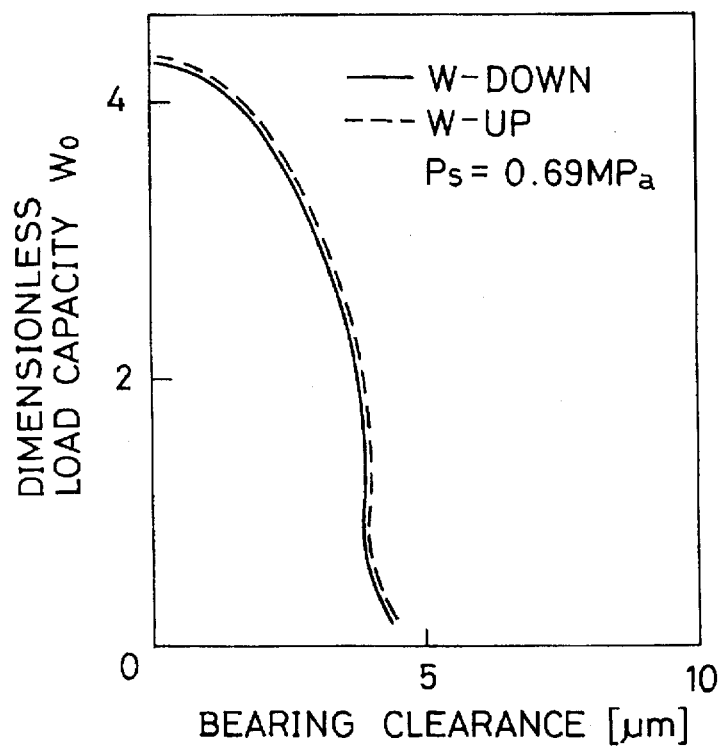
FIG. 6 is a graph showing a bearing characteristic curve according to the embodiment of the present invention.

Next, real characteristic data of the aerostatic thrust bearing according to the embodiment of the present invention will be described. As shown in FIG. 6, the bearing characteristic curve is represented by the relation between dimensionless load capacity W0 and bearing clearance hb.

The design conditions of a prototype bearing are as follows. The width and length of the bearing surface 23 are 45 mm each. The width and depth of the air-in grooves 24a to 24c of the bearing surface 23 are 0.6 mm and 30 μm, respectively. The size of the space surrounded by the groove 24c is 31.5 mm×31.5 mm. The diameter of the through-hole 25 is 0.6 mm. The diameter of the restricting disc 33 is 6 mm. The diameter of the through-hole 32 of the restricting disc 33 is 0.2 mm. The initial length of the restricting spacing hr is 10.5 μm.

The prototype bearing was disposed in a predetermined housing in such a manner that the bearing surface faced downward. Pressured air was supplied to the bearing through a dryer and a filter. A load was applied to the bearing by an air cylinder. The bearing clearance was measured by a non-contact type displacement meter.

As shown in FIG. 6, a very high bearing stiffness was obtained up to dimensionless load capacity W0=2.4. For convenience, a characteristic curve (solid line) in the case that the load W increases and a characteristic curve (dotted line) in the case that the load W decreases are shown as separated from each other in FIG. 6. However, actually, these characteristic curves completely accord with each other and thereby there is no hysteresis. Thus, it is clear that the variable restricting operation due to the diverging flow effectively works.

The data shown in FIG. 6 shows the case of which air-in pressure is 0.69 MPa. However, when the air-in pressure is decreased, the slope of the hr—W0 characteristic curve decreases. The region for high bearing stiffness can be freely allocated with the length of the restricting spacing hr, the diameters of the through-holes 36 and 25, which are air-in holes, the spring constant of the circular leaf spring 34, the air-in pressure, and so forth.

Figure 7:
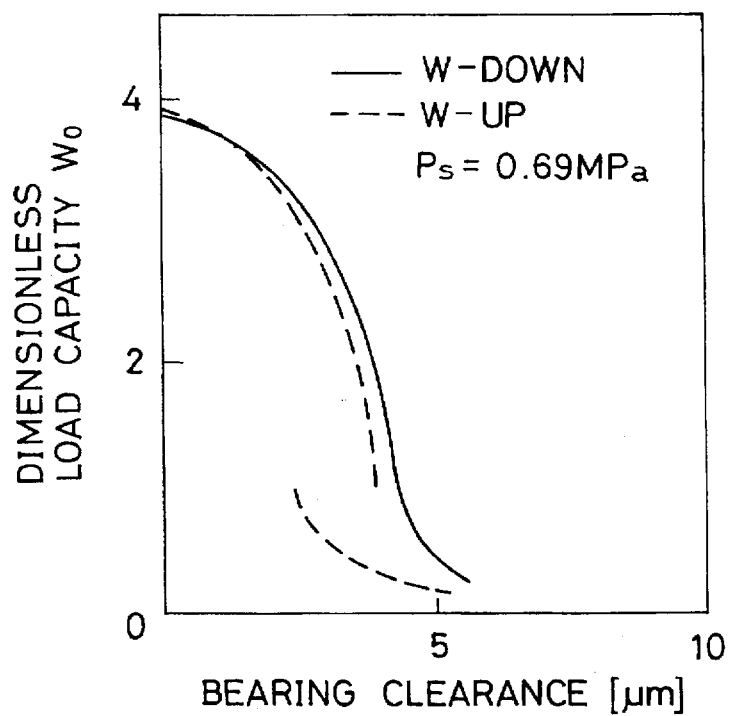
FIG. 7 is a graph showing a bearing characteristic curve according to the related art reference.
Figure 8:
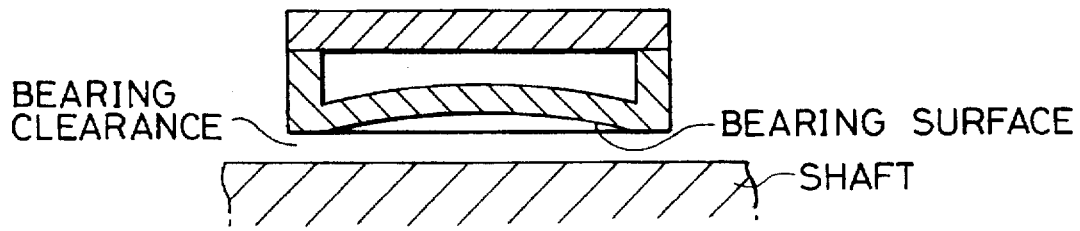
FIG. 8 is a sectional view showing the structure of a conventional variable restrictor.
Figure 9:
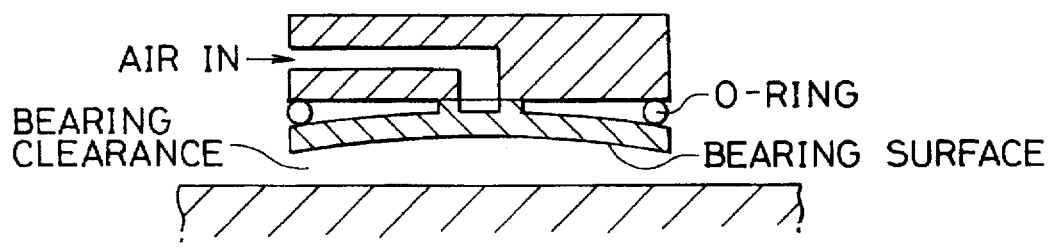
FIG. 9 is a sectional view showing the structure of another conventional variable restrictor.
Figure 10:
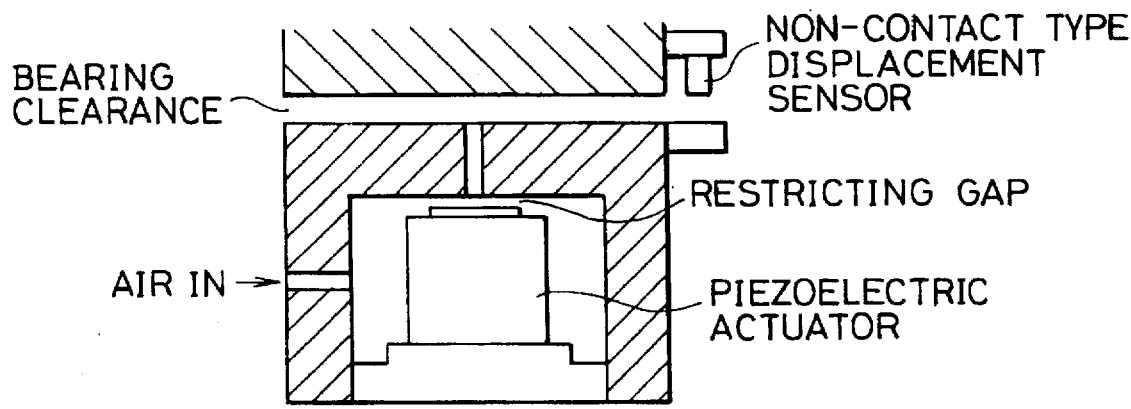
FIG. 10 is a sectional view showing the structure of a further conventional variable restrictor.

For comparison, data of which the converging flow described above with FIG. 5 is shown in FIG. 7 corresponding to FIG. 6. With the self-controlled restrictor in this structure, the bearing stiffness can be increased. However, since the variable restricting operation is unstable, a hysteresis takes place due to an increase/decrease of the load. In addition, the characteristic curve has a disconnected point where the bearing clearance hr abruptly changes.

It should be noted that the present invention is not limited to the above-described embodiment. Although, in the above-described embodiment, the aerostatic bearing was described, the present invention can be applied to another hydrostatic bearing using another gas or a liquid such as a lubrication oil.

As described above, according to the present invention, since the self-controlled restrictor using the diverging flow is applied to the hydrostatic bearing, very high bearing stiffness can be attained. In addition, the repeatability of the characteristics is high and stable. Thus, when the self-controlled restrictor is used for the hydrostatic bearing of the guide surface of a precise measuring unit, a measuring system with a strong resistance against load variation and high measuring accuracy can be accomplished. In addition, in the hydrostatic bearing according to the present invention, since the bearing portion and the self-controlled restrictor are adjacently disposed, high response characteristics can be obtained.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A hydrostatic bearing mounted on a first member for supporting a second member with fluid pressure, the first and second members being adjacently disposed with each other so as to be relatively movable, comprising:

a bearing base adapted to face the second member with a bearing clearance; and self-controlled restricting means for automatically adjusting flow rate of fluid supplied to said bearing clearance corresponding to a pressure applied to said bearing base, wherein said bearing base comprises:

a bearing pad portion having a bearing surface opposite to the second member with the bearing clearance, said bearing surface being communicated with the reverse surface of said bearing pad portion via a plurality of first through-holes, said first through-holes being arranged on a circular periphery of said bearing surface; and a housing portion formed on the reverse surface of said bearing pad portion so as to have a cylindrical hole for equally exposing said first through-holes, and said self-controlled restricting means comprises:

a circular restricting member buried in said cylindrical hole in such a manner that a sealed variable restricting spacing is formed with the reverse surface of said bearing pad portion, said circular restricting member having a second through-hole at the center for supplying said fluid from outside to said restricting spacing, said fluid flowing as a diverging flow in said restricting spacing to be supplied in said bearing clearance via said first through-holes; and a support member buried in said cylindrical hole for elastically supporting said circular restricting member.

2. The hydrostatic bearing according to claim 1, wherein said circular restricting member is movably supported by an O ring, whereby said restricting spacing is sealed.

3. The hydrostatic bearing according to claim 1, wherein said bearing pad portion has cross-shaped grooves perpendicularly intersecting at the center of said bearing surface and a square-shaped groove connecting ends of said cross-shaped grooves, said cross-shaped grooves and said square-shaped groove being formed on said bearing surface, said first through-holes being formed to overlay to said cross-shaped grooves.

4. The hydrostatic bearing according to claim 1, wherein said circular restricting member and said support member for elastically supporting said circular restricting member are integrally formed with each other of a bottomed cylindrical member by machining a plurality of slits on the periphery of said bottomed cylindrical member, said circular restricting member being formed of a bottom plate portion of said bottomed cylindrical member, said second through-hole being formed at the center of said bottom plate portion, said support member having a circular leaf spring defined by said slits to serve as an elastic hinge and a cylindrical support portion being formed of the rest portion of said bottomed cylindrical member.

5. The hydrostatic bearing according to claim 4, wherein said circular leaf spring is formed by machining at least two pairs of slits on said bottomed cylindrical member, a first pair of said two pairs of slits being formed at a predetermined height position of said bottomed cylindrical member in such a manner that two joint portions are left at intervals of 180 degrees, a second pair of said two pairs of slits being formed at a different height position from said first pair in such a manner that two joint portions are left at intervals of 180 degrees, the first and second pairs of slits being 90 degrees shifted from each other.

6. The hydrostatic bearing according to claim 4, wherein the outer diameter of said bottom plate portion and said circular leaf spring portion of said bottomed cylindrical member is smaller than the outer diameter of said cylindrical support portion of said bottomed cylindrical member.

7. The hydrostatic bearing according to claim 4, wherein said circular restricting member and said support member are inserted into a cylindrical socket and secured thereto.

8. A hydrostatic bearing having a self-controlled restrictor, comprising:
- a bearing base having a bearing pad portion and a housing portion, said bearing pad portion having a bearing surface communicated with the reverse surface via a plurality of first through-holes, said first through-holes being arranged on a circular periphery of said bearing surface, said housing portion having a cylindrical hole on the reverse surface of said bearing pad portion, said cylindrical hole being adapted for equally exposing said first through-holes;
- a circular restricting member movably buried in said cylindrical hole in such a manner that a sealed variable restricting spacing is formed with the reverse surface of said bearing pad portion, said circular restricting member having a second through-hole at the center for supplying fluid from outside to said restricting spacing, said fluid flowing in said restricting spacing as a diverging flow to be supplied to said bearing clearance through said first through-holes;
- a cylindrical support member buried in said cylindrical hole for supporting said circular restricting member;
- a connecting member for elastically connecting said cylindrical support member and said circular restricting member; and
- a damping member buried in said cylindrical hole along with said circular restricting member for supporting the outer periphery of said circular restricting member and for sealing said restricting spacing.

9. The hydrostatic bearing according to claim 8, wherein said damping member is an O ring that also functions as a sealing member for sealing said restricting spacing.

10. The hydrostatic bearing according to claim 8, wherein said bearing base has cross-shaped grooves perpendicularly intersecting at the center of said bearing surface and a square-shaped groove connecting ends of said cross-shaped grooves, said cross-shaped grooves and said square-shaped groove being formed on said bearing surface, said first through-holes being formed to overlay to said cross-shaped grooves.

11. The hydrostatic bearing according to claim 8, wherein said circular restricting member, said connecting member, and said cylindrical support member are integrally formed with each other of a bottomed cylindrical member by machining a plurality of slits on the periphery of said bottomed cylindrical member, said circular restricting member being formed of a bottom plate portion of said bottomed cylindrical member, said second through-hole being formed at the center of said bottom plate portion, said connecting member being a circular leaf spring defined by said slits to serve as an elastic hinge, said cylindrical support member being formed of the rest portion of said bottomed cylindrical member.

12. The hydrostatic bearing according to claim 11, wherein said circular leaf spring is formed by machining at least two pairs of slits on said bottomed cylindrical member, a first pair of said two pairs of slits being formed at a predetermined height position of said bottomed cylindrical member in such a manner that two joint portions are left at intervals of 180 degrees, a second pair of said two pairs of slits being formed at a different height position from said first pair in such a manner that two joint portions are left at intervals of 180 degrees, the first and second pairs of slits being 90 degrees shifted from each other.

13. The hydrostatic bearing according to claim 11, wherein the outer diameter of said bottom plate portion and said circular leaf spring portion of said bottomed cylindrical member is smaller than the outer diameter of said cylindrical support member portion of said bottomed cylindrical member.

14. The hydrostatic bearing according to claim 11, wherein said circular restricting member, said connecting member and said cylindrical support member are inserted into a cylindrical socket and secured thereto.

* * * * *